(12) United States Patent
Ito et al.

(10) Patent No.: US 11,433,455 B2
(45) Date of Patent: Sep. 6, 2022

(54) SINTERED BEARING AND METHOD FOR MANUFACTURING SAME

(71) Applicant: NTN CORPORATION, Osaka (JP)

(72) Inventors: Yoshinori Ito, Aichi (JP); Sunao Shimizu, Aichi (JP); Eiichirou Shimazu, Mie (JP); Takahiro Okuno, Mie (JP)

(73) Assignee: NTN CORPORATION, Osaka (JP)

( * ) Notice: Subject to any disclaimer, the term of this patent is extended or adjusted under 35 U.S.C. 154(b) by 1052 days.

(21) Appl. No.: 16/106,528

(22) Filed: Aug. 21, 2018

(65) Prior Publication Data

US 2018/0354029 A1 Dec. 13, 2018

Related U.S. Application Data

(62) Division of application No. 14/346,447, filed as application No. PCT/JP2012/073848 on Sep. 18, 2012, now Pat. No. 10,081,056.

(30) Foreign Application Priority Data

Sep. 22, 2011 (JP) ................................. 2011-207802
Jan. 31, 2012 (JP) ................................. 2012-018713
(Continued)

(51) Int. Cl.
*B22F 1/00* (2022.01)
*B32B 15/01* (2006.01)
(Continued)

(52) U.S. Cl.
CPC ............ *B22F 1/0003* (2013.01); *B22F 1/068* (2022.01); *B22F 3/02* (2013.01); *B22F 3/10* (2013.01);
(Continued)

(58) Field of Classification Search
None
See application file for complete search history.

(56) References Cited

U.S. PATENT DOCUMENTS

| 2005/0265884 A1 | 12/2005 | Shimizu et al. |
| 2008/0146467 A1 | 6/2008 | Takayama |

(Continued)

FOREIGN PATENT DOCUMENTS

| CN | 1241250 | 1/2000 |
| CN | 1665625 | 9/2005 |

(Continued)

OTHER PUBLICATIONS

International Search Report dated Dec. 25, 2012 in International (PCT) Application No. PCT/JP2012/073848.
(Continued)

*Primary Examiner* — Alexandra M Moore
(74) *Attorney, Agent, or Firm* — Wenderoth, Lind & Ponack, L.L.P.

(57) ABSTRACT

Provided is a sintered bearing that is capable of reducing cost through reduction in usage amount of copper, excellent in initial running-in characteristics and quietness, and is high in durability. Raw material powders including iron powder, flat copper powder, low-melting point metal powder, and graphite are loaded into a mold, and a green compact is formed under a state in which the flat copper powder is caused to adhere onto a molding surface. Subsequently, sintering is carried out without causing iron in the green compact to react with carbon so that an iron structure is formed of a ferrite phase. In this manner, a sintered bearing (1) including a base part (S2) including copper at a uniform content, and a surface layer (S1) covering a surface of the base part (S2) and including copper at a larger content than the base part (S2) can be obtained.

6 Claims, 7 Drawing Sheets

(30) Foreign Application Priority Data

Feb. 2, 2012 (JP) ................................ 2012-020855
Feb. 2, 2012 (JP) ................................ 2012-020858

(51) Int. Cl.
| | |
|---|---|
| *F16C 33/12* | (2006.01) |
| *B22F 7/06* | (2006.01) |
| *B22F 3/02* | (2006.01) |
| *B22F 3/10* | (2006.01) |
| *F16C 33/10* | (2006.01) |
| *B22F 1/068* | (2022.01) |

(52) U.S. Cl.
CPC .............. *B22F 7/06* (2013.01); *B32B 15/015* (2013.01); *F16C 33/104* (2013.01); *F16C 33/128* (2013.01); *B32B 2255/06* (2013.01)

(56) References Cited

U.S. PATENT DOCUMENTS

| | | |
|---|---|---|
| 2009/0071290 A1 | 3/2009 | Shimizu et al. |
| 2009/0129963 A1 | 5/2009 | Shimizu et al. |
| 2012/0244029 A1 | 9/2012 | Shimizu et al. |

FOREIGN PATENT DOCUMENTS

| | | |
|---|---|---|
| CN | 101166596 | 4/2008 |
| CN | 10120343 | 6/2008 |
| CN | 101684536 | 3/2010 |
| CN | 101775521 | 7/2010 |
| GB | 2 333 779 | 8/1999 |
| JP | 2001-107162 | 4/2001 |
| JP | 2003-120674 | 4/2003 |
| JP | 2003-221606 | 8/2003 |
| JP | 3873275 | 1/2007 |
| JP | 2008-69384 | 3/2008 |
| JP | 2010-77474 | 4/2010 |
| JP | 2011-94167 | 5/2011 |

OTHER PUBLICATIONS

International Preliminary Report on Patentability and Written Opinion of the International Searching Authority dated Apr. 3, 2014 in International (PCT) Application No. PCT/JP2012/073848.
Office Action dated March 26, 2015 in corresponding Chinese Application No. 201280045531.1, with partial English translation.
Notice of sending a duplicate of a Written Opposition dated Jul. 4, 2017 in corresponding Japanese Patent No. 6038459, with Machine Translation.
Office Action dated Mar. 27, 2018 in Chinese Application No. 201610806753.0, with English transalation of Search Report.

FIG. 11
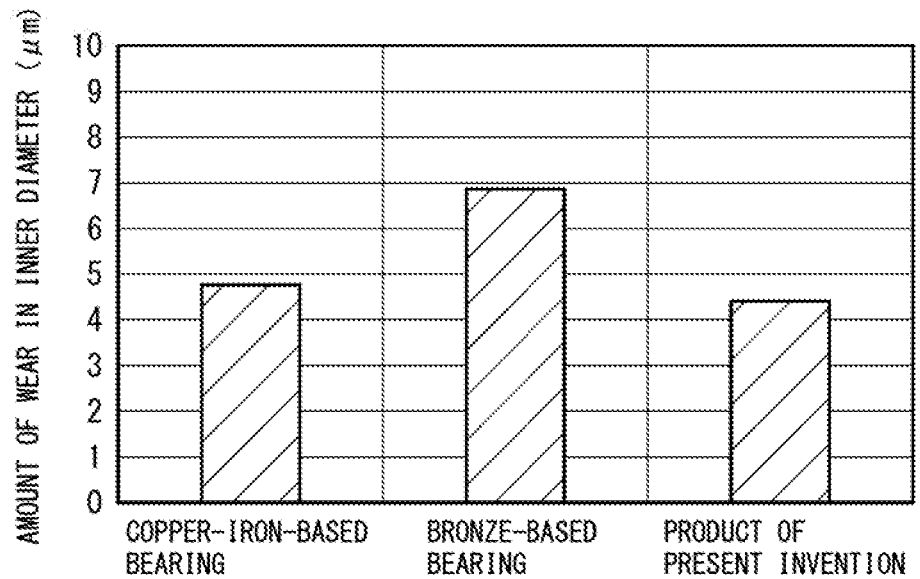
FIG. 12
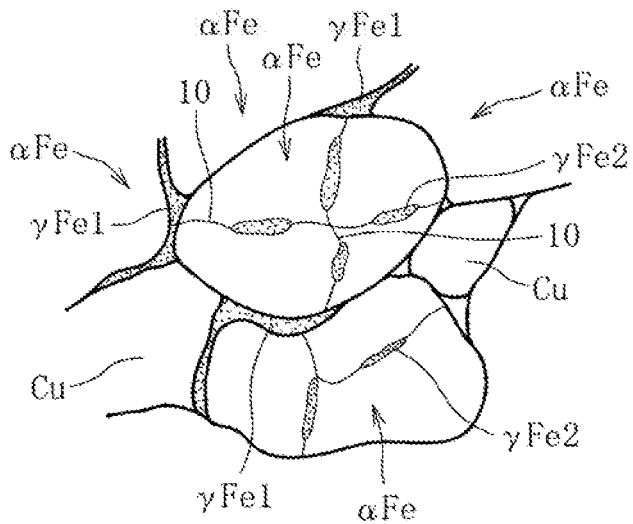
FIG. 13
| Fe | Cu (NORMAL COPPER POWDER) | Cu (FLAT COPPER POWDER) | Sn | C |
|---|---|---|---|---|
| BALANCE | 8~12 | 10~15 | 1.0~2.0 | 0.6~1.0 |

SINTERED BEARING AND METHOD FOR MANUFACTURING SAME

TECHNICAL FIELD

The present invention relates to a sintered bearing made of a sintered, metal, and a method of manufacturing the sintered bearing.

BACKGROUND ART

Sintered bearings excellent in quietness may be used as bearings for a small precision motor to be mounted on an information device such as a hard disk drive. Along with improvement in performance of the motor in recent years, there is a demand to increase a PV limit value of this type of sintered bearing up to PV>200 MPa·m/min. Further, it is also necessary to realize reduction in fluctuation of torque (improvement in initial running-in characteristics), improvement in durability (improvement in seizure resistance), improvement in quietness (improvement in acoustic absorption characteristics), and the like.

As the sintered bearing, an iron-based sintered bearing is publicly known. The iron-based sintered bearing is excellent in durability, but is disadvantageous in poor initial running-in characteristics and quietness. Therefore, a bronze-based sintered bearing is often used as the bearing for a small precision motor. As an example of the bronze-based sintered bearing impregnated with oil, for example, JP 2001-107162 A (Patent Literature 1) discloses a bronze-based sintered bearing containing Sn at 6 to 11 wt %, Fe and/or Ni at 1 to 5 wt %, and copper as the balance (claim 1).

Further, JP 3873275 B2 (Patent Literature 2) discloses a slide component obtained by using iron-based raw material powder and copper-based raw material powder that is flat powder, and by segregating copper on the surface side so that the ratio of copper is reduced and the ratio of iron is increased in a range of from the surface side toward the inner side (claim 1). Further, there is obtained a bearing by loading the copper-based raw material powder and the iron-based raw material powder into a loading unit, applying vibrations thereto so as to segregate the copper-based flat powder on the surface side and cover the surface side with copper, thereby attaining such a concentration gradient that the ratio of iron is higher than that of copper in a range of from the surface side toward the inner side (paragraph 0028).

CITATION LIST

Patent Literature 1: JP 2001-107162 A
Patent Literature 2: JP 3873275 B2

SUMMARY OF INVENTION

Technical Problems

In recent years, the price of copper has been rising, and the bronze-based sintered bearing containing a large amount of copper as disclosed in Patent Literature 1 cannot meet the demand for cost reduction. Further, the bronze-based sintered bearing has drawbacks to load capacity and durability.

In the configuration disclosed in Patent Literature 2, on the other hand, vibrations are applied to the raw material powders containing the flat powder and the copper powder, and hence the molding step becomes complicated. Further, as is apparent from, the description that "even if the slide surface along which the rotor is slidable is worn, copper is contained at a predetermined ratio in a region below the slide surface, and hence the durability of the slide portion becomes excellent" (paragraph 0029 etc.), this configuration is intended to suppress the wear of the mating member with copper after the copper-rich surface layer is worn. In this configuration, when the durability is to be improved, the usage amount of copper is increased inevitably, and hence it is difficult, to realize both the improvement in durability and the reduction in cost.

It is therefore an object of the present indention to provide a sintered bearing that is capable of reducing cost through reduction in usage amount of copper, excellent in initial running-in characteristics and quietness, and is high in durability, and to provide a method of manufacturing the sintered bearing.

Solution to Problems

In order to attain the above-mentioned object, according to one embodiment of the present invention, there is provided a sintered bearing containing an iron structure and a copper structure, the copper structure and the iron structure being bonded to each other with a low-melting point metal, the copper structure being partially or entirely formed of flat copper powder, the iron structure being mainly formed of a ferrite phase, the sintered bearing comprising: a base part comprising copper at a uniform content; and a surface layer covering a surface of the base part, the surface layer comprising copper at a larger content than the base part.

The flat copper powder has property of adhering onto a molding surface at the time of molding the raw material powders. Therefore, a green compact obtained after molding contains a large amount of copper in the surface layer, and has a small copper content in the core part. Thus, the surface layer that is rich in copper content and the base part that is smaller in copper content than the surface layer are formed in a sintered compact obtained after sintering.

When the copper content is thus increased in the surface layer, the initial running-in characteristics and the quietness can be improved. Further, the aggressiveness to the shaft is reduced as well, and hence the durability life is prolonged. Those actions and effects can be attained more remarkably when the copper structure (structure containing copper as a main component) is formed in a surface of the surface layer at an area ratio of 60% or more. Further, even if the surface layer is worn and the base part containing a large amount of the iron structure (structure containing iron as a main component) is therefore exposed, the iron structure mainly contains the ferrite phase, and hence, even if the copper content is small, the aggressiveness to the shaft can be suppressed and the durability is increased.

Further, the iron structure of the base part mainly contains the soft ferrite phase, but the iron structure and the copper structure as well as the respective copper structures are firmly bonded to each other with the low-melting point metal, and hence the base part has high strength. Thus, the strength of the entire bearing is increased, with the result that the load capacity can be improved. Although the base part occupies substantially the entire volume of the bearing, the copper content of the base part can be reduced, and hence the usage amount of copper can be reduced in the entire bearing, with the result that the cost can be reduced.

As described above, in the present invention, the distribution of iron and copper in the bearing is optimized, and in addition, the form of the iron structure as well as the copper structure is taken into consideration. Accordingly, it is possible to realize both the improvement in durability and the reduction in cost. With this configuration, according to the present invention, a sintered bearing having the advantages of both the iron-based sintered bearing and the copper-based sintered bearing (also including the iron-copper-based sintered bearing) can be obtained at low cost.

In this sintered bearing, when the sintering is carried out without causing iron to react with carbon, the iron structure can be formed of the ferrite phase alone. In the case where the iron structure is thus formed of the ferrite phase, the wear resistance of the bearing surface is reduced when the surface layer is worn and the base part is therefore exposed. In a case where this phenomenon becomes a problem, iron is caused to react with carbon at the time of sintering so that the iron structure can be formed of the ferrite phase and a pearlite phase that is present at a grain boundary of the ferrite phase. With this configuration, the hard pearlite phase compensates for the wear resistance of the ferrite phase, and hence the wear of a bearing surface can be suppressed. Meanwhile, when the presence ratio of pearlite becomes excessively high through diffusion of carbon, the aggressiveness to the shaft is increased, and hence the shaft is easily worn. From the above-mentioned viewpoints, the amount of the pearlite phase is set to the extent that the pearlite phase is present (in a scattered manner) at the grain boundary of the ferrite phase (see FIG. 12).

In general, as the content of the low-melting point metal becomes larger, the strength of the bearing becomes higher accordingly. Meanwhile, in a state of a liquid phase of Cu—Sn, the flat copper powder is rounded due to surface tension to have a spherical shape. When the amount of flat copper having the spherical shape is increased, the area of the copper structure that occupies the surface of the bearing is reduced, and hence the object of the invention (improvement in initial running-in characteristics and quietness and reduction in aggressiveness to the mating member) cannot be attained. From the above-mentioned viewpoints, the ratio of the low-melting point metal to copper is set to less than 10 wt %.

When a solid lubricant is contained in the metal structure, the friction of the bearing surface can be reduced. A similar effect can be attained also when free graphite is contained in the metal structure.

When the content of free graphite is set larger in the surface layer than in the base part, the friction can further be reduced.

The sintered bearing according to one embodiment of the present invention can be manufactured by: mixing raw material powders comprising iron powder, flat copper powder, and low-melting point metal powder; loading the raw material powders into a mold; forming a green compact by compressing the raw material powders under a state in which the flat copper powder is caused to adhere onto a surface of the mold; and sintering the green compact.

When the raw material powders are loaded into the mold and the green compact is formed under the state in which the flat copper powder is caused to adhere onto the molding surface, the green compact obtained after the molding contains a large amount of copper in the surface layer, and has a small copper content in the core part. Thus, the surface layer that is rich in copper content and the base part that is smaller in copper content than the surface layer are formed in the sintered compact obtained after the sintering.

In this case, when the sintering is carried out without causing iron in the green compact to react with carbon so that the iron structure is formed of the ferrite phase, even if the surface layer is worn and the base part containing a large amount of the iron structure (structure containing iron as a main component) is therefore exposed, the iron structure is formed of the ferrite phase, and hence, even if the copper content is small, the aggressiveness to the shaft can be suppressed and the durability is increased.

In order that the sintering be carried out without causing iron in the green compact to react with carbon, it is desired that the sintering temperature be set to 700° C. to 840° C. In this case, it is further desired that the sintering be carried out in an atmosphere without carbon.

Meanwhile, in the case where the iron structure is formed of the ferrite phase alone as described above, the wear resistance of the bearing surface may be reduced when the surface layer is worn and the base part is therefore exposed.

In this case, the sintering is carried out to cause iron in the green compact to react with carbon so that the iron structure is formed of the ferrite phase and a pearlite phase that is present at a grain boundary of ferrite.

Thus, the iron structure is formed of a two-phase structure containing the ferrite phase and the pearlite phase that is present at the grain boundary of the ferrite phase. Accordingly, the hard pearlite phase compensates for the wear resistance of the ferrite phase, and hence the wear of the bearing surface can be suppressed. Meanwhile, when the presence ratio of pearlite becomes excessively high through diffusion of carbon, the aggressiveness to the shaft is increased, and hence the shaft is easily worn. From the above-mentioned viewpoints, the amount of pearlite is set to the extent, that pearlite is present (in a scattered manner) at the grain boundary of the ferrite phase (see FIG. 12).

In order that the sintering be carried out to cause iron in the green compact to react with carbon so that the iron structure is formed of the ferrite phase and the pearlite phase that is present at the grain boundary of ferrite, it is desired that the sintering temperature be set to 820° C. to 900° C. In this case, it is further desired that the sintering be carried out in the atmosphere with carbon.

When the flat copper powder has an apparent density of 1.0 g/cm$^3$ or less, a thickness of 1.5 μm or less, and a length of 20 μm or more and 80 μm or less, the force of adhesion of the flat copper powder to the molding surface is further increased, and hence the surface layer that is rich in copper content can be formed reliably.

When the ratio of the flat copper powder in the raw material powders is set to 8 wt % or more, a sufficient, amount of flat copper powder can be caused to adhere onto the molding surface.

When the flat copper powder is used alone as the copper powder, the density of the flat copper powder is low, and hence the powder is difficult to compact at the time of forming the green compact. Therefore, normal copper powder is added and used in combination with the flat copper powder, with the result that the formability of the green compact can be enhanced. Further, in order to reduce the aggressiveness to the shaft when the surface layer is worn and the base part is therefore exposed, abase part S2 needs to have a copper structure of at least 10 wt % or more. Thus, the blending ratio of the copper powder is set to 18 wt % or more, which is the total of both the above-mentioned values. When the ratio of the copper powder is higher than 40 wt %, on the other hand, the content of the iron structure in the base part becomes insufficient, which may lead to reduction in strength. Further, the usage amount of the copper powder becomes excessively large, and hence the cost advantage to be attained through the use of the flat copper powder becomes poor. From the facts described above, the ratio of the flat copper powder and the normal copper powder in the raw material powders is set to 18 wt % or more and 40 wt % or less in total.

In general, as the content of the low-melting point metal becomes larger, the strength of the bearing becomes higher accordingly. Meanwhile, in the state or the liquid phase of Cu—Sn, the flat copper powder is rounded due to surface tension to have a spherical shape. When the amount of flat copper having the spherical shape is increased, the area of the copper structure that occupies the surface of the bearing is reduced, and hence the object of the invention (improvement in initial running-in characteristics and quietness and reduction in aggressiveness to the mating member) cannot be attained. From the above-mentioned viewpoints, the ratio of the low-melting point metal to copper is set to less than 10 wt %.

When a fluid lubricant is caused to adhere to the flat copper powder before the mixing, the force of adhesion of the flat copper powder to the molding surface is further increased. When the ratio of the fluid lubricant to the flat copper powder is excessively low, the force of adhesion of the flat copper powder to the mold is reduced, and hence the amount of adhesion of the flat copper powder onto the molding surface becomes insufficient. When the ratio of the fluid lubricant to the flat copper powder is excessively high, on the other hand, grains of the flat copper powder are caused to adhere to each other, which may lead to a problem of coagulation. According to investigation conducted by the inventors of the present invention, it was found that the above-mentioned problem was able to be solved when 0.1 wt % to 0.8 wt %, desirably 0.2 wt % to 0.7 wt % of the fluid lubricant was blended in terms of a weight ratio to the flat copper powder.

As the fluid lubricant, a fatty acid, in particular, a linear saturated fatty acid is preferred. This kind of fatty acid is expressed by a general formula of $C_{n-1}H_{2n-1}COOH$. In the present invention, it is desired to use a fatty acid having Cn within a range of from 12 to 22.

When graphite is added to the raw material powders, the friction of the bearing surface can be reduced. In this case, when flake graphite is used, the flake graphite and the flat copper powder are easily caused to adhere to each other at the time of mixing the raw material powders, and a large amount of graphite adheres onto the molding surface together with the flat copper powder. In this case, the graphite content as well as the copper content is increased in the surface of the green compact, which is more effective in reducing the friction of the bearing surface.

By the way, the apparent density of the flat copper powder is much lower than that of the other powders contained in the raw material powders, and hence, when the powders including the flat copper powder are mixed at the same time, the flat copper powder is difficult to uniformly disperse in the raw material powders. Therefore, at the time of mass production of the sintered bearing, the content ratio of the flat copper powder differs among the individual bearings, with the result that the performance of the bearings may become unstable.

In order to solve this problem, it is desired that foil-like solid lubricant powder be added to the raw material powders, and that the mixing of the raw material powders comprise separately carrying out primary mixing for mixing the flat copper powder and the foil-like solid lubricant powder, and subsequent secondary mixing for adding and mixing the iron powder and the low-melting point metal powder.

In general, the flat copper powder and the foil-like solid lubricant powder tend to adhere to each other. Therefore, when the flat copper powder and the foil-like solid lubricant powder are mixed together in advance through the primary mixing, the flat copper powder and the solid lubricant powder can be caused to adhere to each other and superimposed in a layered shape. Thus, the apparent density of the flat copper powder is increased, and hence, even when the iron powder and the low-melting point metal powder are added and mixed through the secondary mixing, the flat copper powder can be dispersed uniformly in the raw material powders. Accordingly, even at the time of mass production, the amount of the flat copper powder contained in the individual sintered bearings can be kept uniform, with the result that the performance of the bearings can be stabilized. Flake graphite may be taken as an example of the foil-like solid lubricant powder.

When a fluid lubricant is caused to adhere to the flat copper powder before the mixing, the force of adhesion of the flat copper powder to the foil-like solid lubricant powder, and further, the force of adhesion of the flat copper powder to the molding surface are increased. When the ratio of the fluid lubricant to the flat copper powder is excessively low, the force of adhesion of the flat copper powder to the mold is reduced, and hence the amount of adhesion of the flat copper powder onto the molding surface becomes insufficient. When the ratio of the fluid lubricant to the flat copper powder is excessively high, on the other hand, grains of the flat copper powder are caused to adhere to each other, which may lead to a problem of coagulation. According to investigation conducted by the inventors of the present invention, it was found that the above-mentioned problem was able to be solved when 0.1 wt % to 0.8 wt %, desirably 0.2 wt % to 0.7 wt % of the fluid lubricant was blended in terms of the weight ratio to the flat copper powder.

As the fluid lubricant, a fatty acid, in particular, a linear saturated fatty acid is preferred. This kind of fatty acid is expressed by a general formula of $C_{n-1}H_{2n-1}COOH$. In the present invention, it is desired to use a fatty acid having Cn within a range of from 12 to 22.

When the flat copper powder is used alone as the copper powder, the density of the flat copper powder is low, and hence the powder is difficult to compact at the time of molding the green compact. Therefore, normal copper powder is added and used in combination with the flat copper powder, with the result that the formability of the green compact can be enhanced. When the normal copper powder is added and mixed at the time of the secondary mixing, the normal copper powder can be dispersed uniformly in the raw material powders.

Advantageous Effects of Invention

According to one embodiment of the present invention, it is possible to provide the sintered bearing that is capable of realizing both the improvement in durability and the reduction in cost through the reduction in usage amount of copper, and is also excellent in initial running-in characteristics and quietness.

BRIEF DESCRIPTION OF DRAWINGS

FIG. 11 is a graph showing measurement results of the amount of wear that occurs in the bearing after running the bearing.

FIG. 12 is a structural view illustrating a grain boundary structure of a base part.

FIG. 13 is a table showing components of the sintered bearing according to the present invention.

DESCRIPTION OF EMBODIMENTS

Now, embodiments of the present invention are described with reference to the accompanying drawings.

Figure 1:
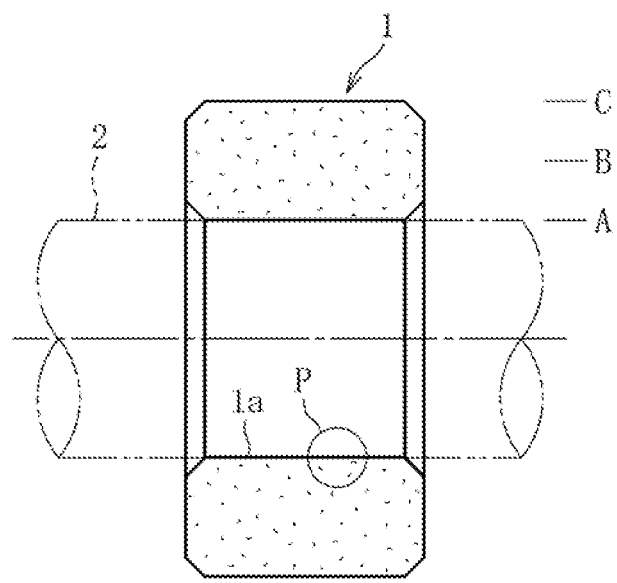
FIG. 1 is a sectional view illustrating a sintered bearing.

As illustrated in FIG. 1, a sintered bearing 1 is formed into a cylindrical shape having a bearing surface 1a on an inner periphery thereof. A shaft 2 made of stainless steel or the like is inserted into the inner periphery of the sintered bearing 1, and the shaft or the bearing 1 is rotated in this state. Then, lubricating oil retained in innumerable pores of the sintered bearing 1 seeps out onto the bearing surface 1a along with temperature rise. Due to the lubricating oil thus seeping out, an oil film is formed in a bearing clearance between an outer peripheral surface of the shaft and the bearing surface 1a, and thus the shaft 2 is supported by the bearing 1 in a relatively rotatable manner.

The bearing 1 of the present invention is formed by loading, into a mold, raw material powders obtained by mixing various powders, and compressing the raw material powders to form a green compact, followed by sintering the green compact.

The raw material powders are mixed powders containing iron powder, copper powder, low-melting point metal powder, and solid lubricant powder as main components thereof. Various molding aids as typified by a lubricant (such as a metal soap) for improving mold releasability are added to the mixed powder as necessary. Now, detailed description is given of raw material powders and a manufacturing procedure for a sintered bearing according to a first embodiment of the present invention.

[Iron Powder]

As the iron powder, reduced iron powder, water-atomized iron powder, or other publicly-known powder may be used widely. In this embodiment, the reduced iron powder excellent in oil retaining property is used. The reduced iron powder has a substantially spherical shape as well as an irregular and porous shape. Further, the reduced iron powder has a sponge-like shape with minute projections and depressions provided on its surface, and hence the reduced iron powder is also called sponge iron powder. As the iron powder, there is used iron powder having a grain size of approximately 40 μm to 150 μm and an apparent density of approximately 2.0 to 2.8 g/cm³. The apparent density is defined in conformity to the requirements of JIS Z8901 (the same applies hereinafter). Note that, the oxygen content of the iron powder is set to 0.2 wt % or less.

[Copper Powder]

As the copper powder, there are used two kinds of copper powder, that is, foil-like flat copper powder and normal copper powder.

Figure 2:
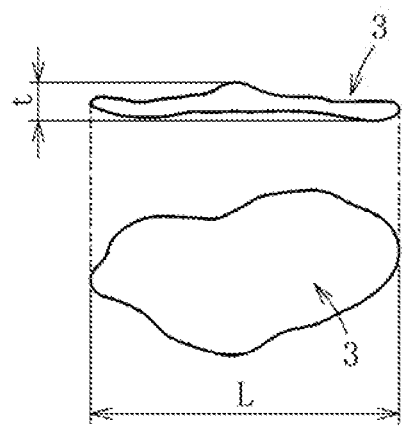
FIG. 2 illustrates flat copper powder in side view on an upper side and in plan view on a lower side.

The flat copper powder is obtained by flattening raw material copper powder containing water-atomized powder and the like through stamping. As the flat copper powder, there is mainly used flat copper powder having a length L of 20 μm to 80 μm and a thickness t of 0.5 μm to 1.5 μm (aspect ratio L/t=13.3 to 160). The "length" and the "thickness" herein refer to the maximum geometric dimensions of individual grains of flat copper powder 3 as illustrated in FIG. 2. The apparent density of the flat copper powder is set to 1.0 g/cm³ or less. When the flat copper powder having the above-mentioned size and apparent density is used, the force of adhesion of the flat copper powder to the molding surface is increased, and hence a large amount of flat copper powder can be caused to adhere onto the molding surface.

As the normal copper powder, there may widely be used spherical or dendritical copper powder, which is generally used for the sintered bearing. For example, reduced powder, electrolytic powder, water-atomized powder, or the like is used. Note that, powders obtained by mixing the above-mentioned powders may be used as well. The grain size of the normal copper powder is set to approximately 20 μm to 100 μm, and the apparent density of the normal copper powder is set to approximately 2.0 to 3.3 g/cm. When the flat copper powder is used alone as the copper powder, the density of the flat copper powder is low, and hence the powder is difficult to compact at the time of forming the green compact. Therefore, the flat copper powder is used in combination with the normal copper powder, with the result that the formability of the green compact can be enhanced. Note that, when there is no particular problem, the flat copper powder may be used alone without using the normal copper powder.

[Fluid Lubricant]

In order to cause the flat copper powder to adhere onto the molding surface, a fluid lubricant is caused to adhere to the flat copper powder in advance. The fluid lubricant only needs to be adhered to the flat copper powder before loading the raw material powders into the mold. Specifically, the fluid lubricant is caused to adhere to the raw material copper powder preferably before mixing the raw material powders, further preferably in the stage of stamping the raw material copper powder. The fluid lubricant may be caused to adhere to the flat copper powder by means of, for example, feeding the fluid lubricant to the flat copper powder and agitating the fluid lubricant and the flat copper powder within a period after stamping the raw material copper powder until mining the flat copper powder with other raw material powders. In order to secure the amount of adhesion of the flat copper powder onto the molding surface, the blending ratio of the fluid lubricant to the flat copper powder is set to 0.1 wt % or more in terms of a weight ratio. Further, in order to prevent coagulation due to the adhesion of grains of the flat copper powder, the blending ratio is set to 0.8 wt % or less. It is desired that the lower limit of the blending ratio be set to 0.2 wt % or more, and the upper limit of the blending ratio be set to 0.7 wt %. As the fluid lubricant, a fatty acid, in particular, a linear saturated, fatty acid is preferred. This kind of fatty acid is expressed by a general formula of $C_{n-1}H_{2n-1}COOH$. As this fatty acid, a fatty acid having Cn within a range of from 12 to 22 may be used, and stearic acid may be used as a specific example.

[Low-Melting Point Metal Powder]

The low-melting point metal powder is metal powder having a melting point lower than the sintering temperature. In the present invention, metal powder having a melting point of 700° C. or less is used, and powder of tin, zinc, or phosphorus is used as an example. Among others, it is preferred to use tin that is less evaporated at the time of sintering. Those low-melting point metal powders have high, wettability with respect to copper, and hence, when the low-melting point metal powder is blended with the raw material powders, liquid phase sintering is progressed, with the result that the bonding strength between the iron structure and the copper structure and the bonding strength between the respective copper structures are increased. As the blending amount of the low-melting point metal becomes larger, the strength of the metal structure becomes higher. In the case where the flat copper powder is used as in the present invention, however, when the amount of the low-melting point metal is excessively large, the flat copper powder is formed into a spherical shape as described above, which may lead to such trouble that the area of copper is reduced in the bearing surface. In the copper-based sintered bearing and the copper-iron-based sintered bearing of the related art, approximately 10 wt % of the low-melting point metal is generally blended with copper, but in the present invention, for the above-mentioned reason, the ratio of the low-melting point metal, to copper is set to less than 10 wt % (desirably 8.0 wt % or less) in terms of the weight ratio.

[Solid Lubricant Powder]

The solid lubricant powder is added so as to reduce friction at the time of metal contact due to sliding between the sintered bearing 1 and the shaft 2, and graphite is used as an example. As graphite in this case, it is desired to use flake graphite so as to attain adhesiveness to the flat copper powder. As the solid lubricant powder, molybdenum disulfide powder may be used as well, as graphite. The molybdenum disulfide powder has a layered crystal, structure, and is peeled in a layered shape. Thus, the adhesiveness to the flat copper powder is attained similarly to flake graphite.

[Blending Ratio]

In order to obtain the raw material powders having the above-mentioned powders blended together, it is desired to blend copper powder at 18 wt % or more and 40 wt % or less, low-melting point metal powder (for example, tin powder) at 1 wt % or more and 4 wt % or less, solid lubricant powder (for example, graphite powder) at 0.5 to 2.5 wt %, and iron powder as the balance.

In the present invention, as described later, the flat copper powder is caused to adhere in a layered shape to the mold at the time of loading the raw material powders into the mold. When the blending ratio of flat copper in the raw material powders is lower than 8 wt %, the amount of adhesion of flat copper to the mold becomes insufficient, and hence the actions and effects of the present invention cannot be expected. Further, in this embodiment, as described later, the surface of a base part S2 serving as the bearing surface when a copper-rich surface layer part S1 (described later) is lost due to wear is formed of a ferrite phase αFe and the copper structure so that the aggressiveness to the shaft is reduced. In order to attain such an effect, the base part S2 needs to have a copper structure of at least 10 wt % or more. Thus, the blending ratio of the copper powder is set to 18 wt %, or more which is the total of both the above-mentioned values. When the copper powder is higher than 40 wt %, on the other hand, the content of the iron structure in the base part becomes insufficient, which may lead to reduction in strength. Further, the usage amount of the copper powder becomes excessively large, and hence the cost advantage to be attained through the use of the flat copper powder becomes poor. From the facts described above, the blending amount of the copper powder in the raw material powders is set to 18 wt % or more and 40 wt % or less. Further, the blending amount of the flat copper powder in the raw material powders is set to 8 wt % or more and 40 wt % or less, desirably 8 wt % or more and 20 wt % or less. The reason why the blending amount of the flat copper powder is preferably 20 wt % or less is because the amount of adhesion of the flat copper powder to the mold is saturated at approximately 20 wt % and hence, even if the blending amount is further increased, there arises a problem of cost increase due to the use of expensive flat copper powder.

When the ratio of the low-melting point metal powder is lower than 1 wt %, the strength of the bearing cannot be secured, and when the ratio of the low-melting point metal powder is higher than 4 wt %, there arises the above-mentioned problem in that the flat copper powder is formed into a spherical shape. Further, when the ratio of the solid lubricant powder is lower than 0.5 wt %, the effect of reducing the friction on the bearing surface cannot be attained, and when the ratio of the solid lubricant powder is higher than 2.5 wt %, the reduction in strength or the like may occur. From the facts described above, the ratio of the low-melting point metal powder to be blended is 1 wt % or more and 4 wt % or less, and the ratio of the solid lubricant powder to be blended is 0.5 to 2.5 wt %. Note that, as described above, it is desired that the blending ratio of the low-melting point metal powder to the copper powder be set to less than 10 wt % (desirably 8 wt % or less).

FIG. 13 shows a particularly preferred blending ratio of the above-mentioned various raw material powders. As shown in FIG. 13, it is particularly preferred to set the normal copper powder to 8 wt % or more and 12 wt % or less, the flat copper powder to 10 wt % or more and 15 wt % or less, the low-melting point metal powder to 1.0 wt % or more and 2.0 wt % or less, and the solid lubricant powder to 0.6 wt % or more and 1.0 wt % or less.

Figure 3:
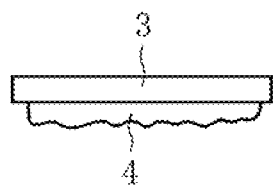
FIG. 3 is a side view illustrating the flat copper powder and flake graphite that adhere to each other.

It is desired that the above-mentioned powders be mixed through two separate operations. First, as primary mixing, flake graphite powder and flat copper powder having a fluid lubricant are caused to adhere thereto in advance are mixed together with a publicly-known mixer. Subsequently, as secondary mining, iron powder, normal copper powder, and low-melting point metal powder are added to and mixed with the primarily-mixed powder, and graphite powder is further added and mixed as necessary. The flat copper powder has a low apparent density among the various raw material powders, and is therefore difficult to uniformly disperse in the raw-material powders. Thus, when the flat copper powder and the graphite powder having an apparent density at the same level are mixed together in advance through the primary mixing, as illustrated in FIG. 3, the flat copper powder 3 and graphite powder 4 are caused to adhere to each other and superimposed in a layered shape due to, for example, the fluid lubricant adhering to the flat copper powder, and accordingly the apparent density of the flat copper powder is increased. Therefore, the flat copper powder can be dispersed uniformly in the raw material powders at the time of secondary mixing. When a lubricant is separately added at the time of primary mixing, the adhesion between the flat copper powder and the graphite powder is further promoted, and hence the flat copper powder can be dispersed more uniformly at the time of secondary mixing.

As the lubricant to be added in this case, a fluid lubricant of the same kind as or the different kind from the above-mentioned fluid lubricant may be used, and a powder lubricant may be used as well. For example, the above-mentioned molding aid such as a metal soap is generally powdery, but has an adhesion force to some extent so that the adhesion between the flat copper powder and the graphite powder can further be promoted.

The adhesion state between the flat copper powder 3 and the flake graphite powder 4 as illustrated in FIG. 3 is maintained to some extent even after the secondary mixing, and hence, when the raw material powders are loaded into the mold, a large amount of graphite powder are caused to adhere onto the surface of the mold together with the flat copper powder.

[Molding]

Figure 4:
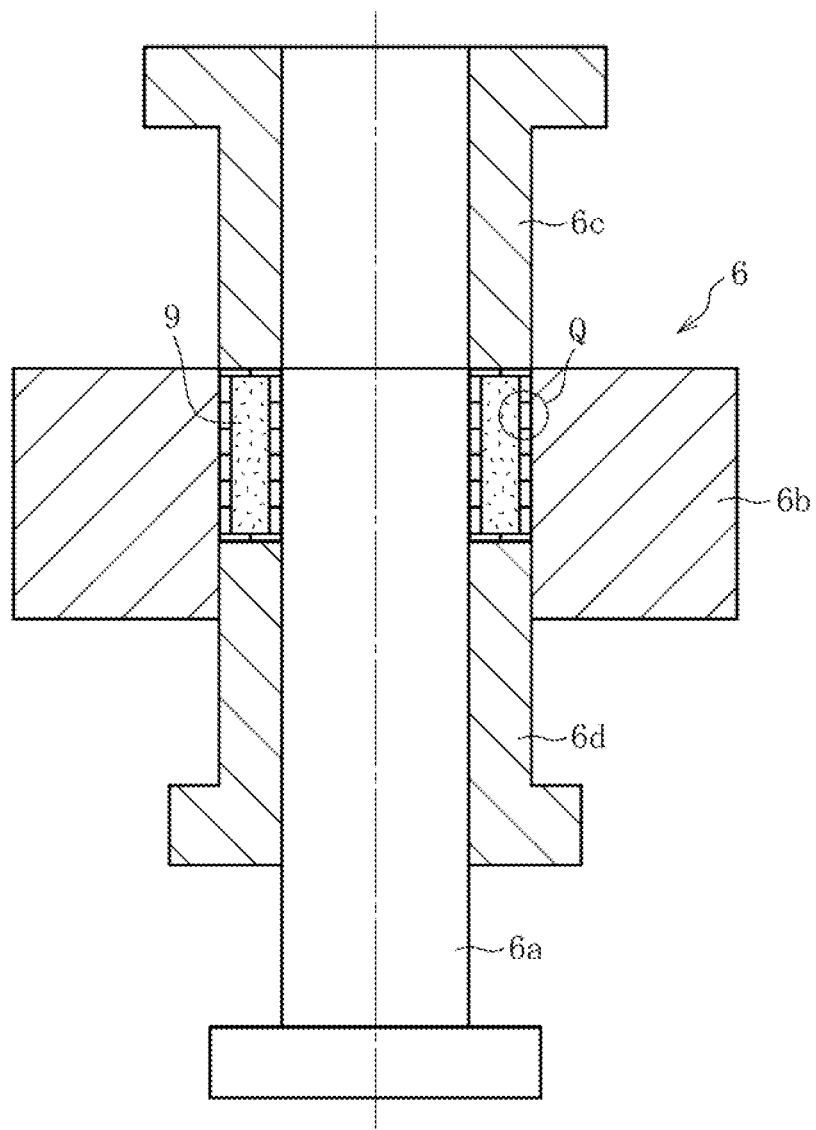
FIG. 4 is a sectional view illustrating a step of forming a green compact through use of a mold.

The raw material powders obtained after the secondary mixing are fed to a mold 6 of a molding machine. As illustrated in FIG. 4, the mold 6 is constructed of a core 6a, a die 6b, an upper punch 6c, and a lower punch 6d, and the raw material powders are loaded into a cavity defined by those components of the mold 6. When the tipper and lower punches 6c and 6d are brought close to each other to compress the raw material powders, the raw material powders are molded by a molding surface defined by an outer peripheral surface of the core 6a, an inner peripheral surface of the die 6b, an end surface of the upper punch 6c, and an end surface of the lower punch 6d, to thereby obtain a cylindrical green compact 9.

Figure 5:
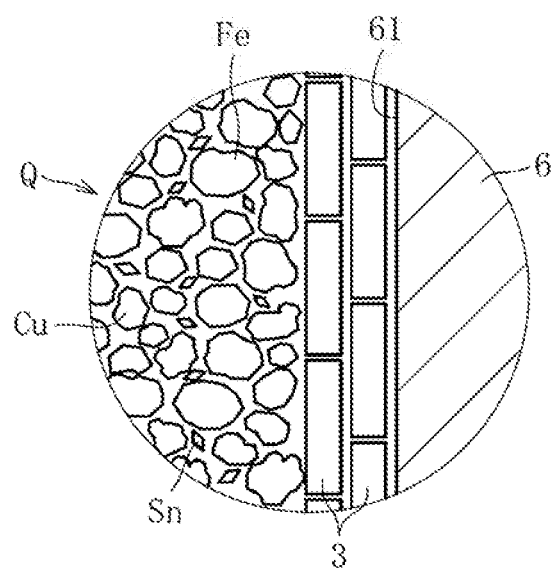
FIG. 5 is an enlarged sectional view illustrating the region Q in FIG. 4.

Among the metal powders of the raw material powders, the flat copper powder 3 has the lowest apparent density. Further, the flat copper powder 3 has a foil-like shape with the above-mentioned length L and thickness t, and its wider surface has a large area per unit weight. Therefore, the flat copper powder is easily affected by the adhesion force that is generated due to the fluid lubricant adhering onto the surface of the flat copper powder, and further by the Coulomb force or the like. After loading the raw material powders into the mold as illustrated in an enlarged manner in FIG. 5, the flat copper powder 3 is caused to adhere to the entire region of a molding surface 61 with its wider surface opposed to the molding surface 61 under a layered state in which a plurality of layers (approximately one to three layers) of the flat copper powder 3 are superimposed. At this time, flake graphite adhering to the flat copper powder 3 is also caused to adhere onto the molding surface 61 of the mold together with the flat copper powder 3 (illustration of graphite is omitted in FIG. 5). In an inner region of the layered structure of the flat copper 3 (region close to the center of the cavity), on the other hand, the iron powder (Fe), the normal copper powder (Cu), and the low-melting point metal powder (Sn) are brought into a state of being dispersed substantially uniformly. In the green compact 9 obtained after the molding, the distribution state of those powders is maintained substantially as it is.

[Sintering]

Figure 6:
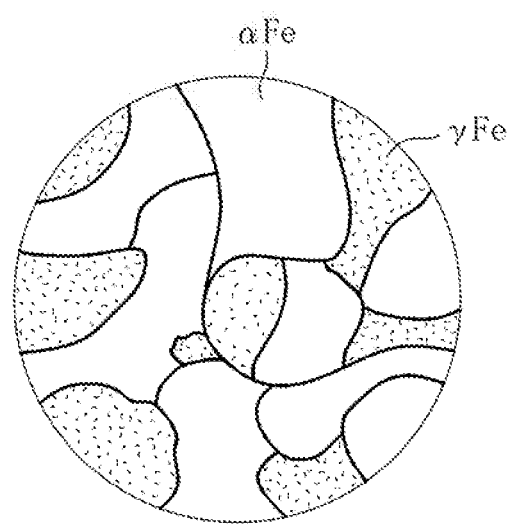
FIG. 6 is a structural view illustrating a pearlite structure in steel.

After that, the green compact 9 is sintered in a sintering furnace. The sintering condition is set to such a condition that carbon contained in graphite does not react with iron (carbon does not diffuse). In a state of equilibrium between iron and carbon, the transformation point is 723° C., and when the temperature becomes higher than the transformation point, iron and carbon start to react with each other to produce a pearlite phase γFe in the steel structure as illustrated in FIG. 6. In the sintering, after the temperature becomes higher than 900° C., carbon (graphite) and iron start to react with each other to produce the pearlite phase γFe. The pearlite phase γFe is a hard structure (HV 300 or more) and has significant aggressiveness to the mating member. Therefore, when the pearlite phase is precipitated excessively, the wear of the shaft 2 may be progressed.

Further, in the manufacturing steps for the sintered bearing of the related art, endothermic gas (RX gas) obtained through thermal decomposition of a mixture of liquefied petroleum gas (such as butane and propane) and air with an Ni catalyst is often used as a sintering atmosphere. However, when the endothermic gas (RX gas) is used, carbon may diffuse to harden the surface, which leads to a similar problem.

From the above-mentioned viewpoints, in the present invention, the sintering is carried out at a low temperature of 900° C. or less, specifically, at a sintering temperature of 700° C. (desirably 760° C.) to 840° C. Further, the sintering atmosphere is set to a gas atmosphere that does not contain carbon (hydrogen gas, nitrogen gas, argon gas, or the like), or to a vacuum. Due to those measures, carbon and iron do not react with each other in the raw material powders, and hence the entire iron structure obtained after the sintering is formed of the soft ferrite phase αFe (HV 200 or less). Along with the sintering, the above-mentioned fluid lubricant, other lubricants, and various molding aids are vaporized from inside the sintered compact.

Through the above-mentioned sintering step, a porous sintered compact is obtained. Sizing is carried out on this sintered compact, and lubricating oil is further impregnated into the sintered compact by a method involving vacuum pressure impregnation or the like, to thereby complete the sintered bearing 1 illustrated in the figures. As described above, at the time of sintering, carbon and iron do not react with each other so that the iron structure is formed of the soft ferrite phase. As a result, the sintered compact is likely to flow plastically at the time of sizing, and thus the sizing can be carried out with high accuracy. Note that, depending on intended, use, the step of impregnating lubricating oil may be omitted so that the sintered bearing 1 is used under the oil-less condition.

Figure 7:
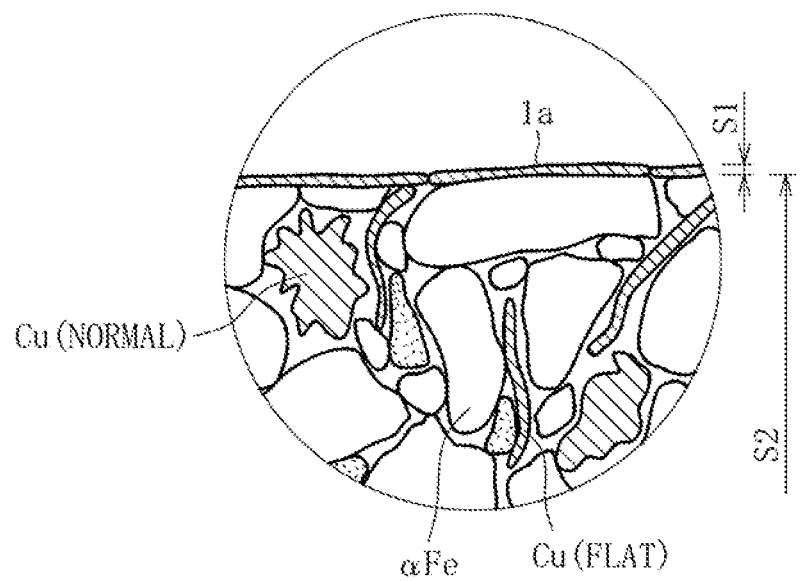
FIG. 7 is an enlarged sectional view illustrating the region P in FIG. 1.
Figure 14:
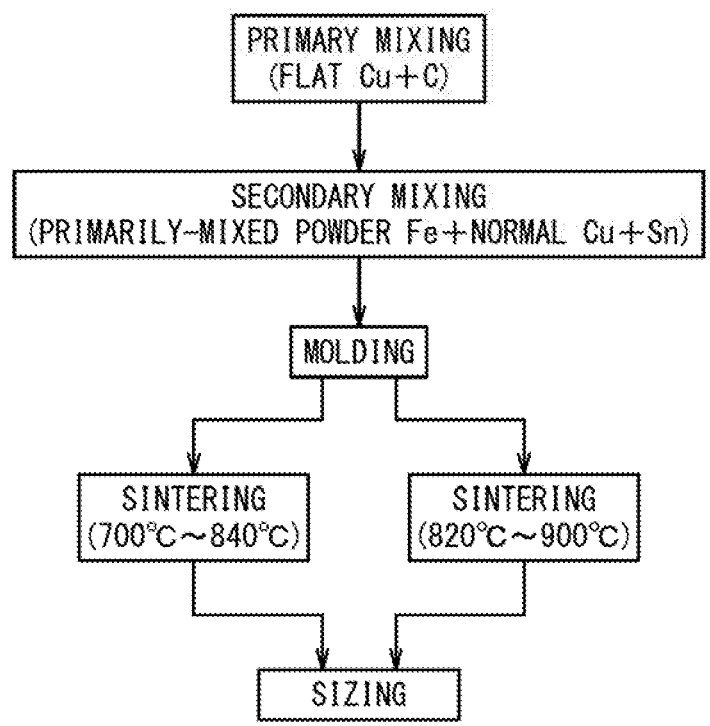
FIG. 14 is a flow chart illustrating a method of manufacturing a sintered bearing according to the present invention.

FIG. 14 illustrates a flow of the above-mentioned manufacturing steps. FIG. 7 schematically illustrates the metal structure in the vicinity of the surface of the sintered bearing 1 obtained through the manufacturing steps (region P in FIG. 1). Note that, FIG. 7 illustrates the copper structure in a hatched pattern, and illustrates graphite in a scattered pattern.

As illustrated in FIG. 7, in the sintered bearing 1 of the present invention, the green compact 9 is formed under a state in which the flat copper 3 is caused to adhere in a layered shape to the molding surface 61. Further, deriving from the fact that the layered flat copper 3 is sintered, the copper-rich surface layer S1 is formed in the entire surface of the bearing 1 including the bearing surface 1a. Besides, the wider surface of the flat copper 3 is caused to adhere onto the molding surface 61, and hence the copper structure of the surface layer S1 mostly has a flat shape, and is oriented under a state in which the wider surface constitutes the surface thereof. The thickness of the surface layer S1 corresponds to the thickness of flat copper, which is caused to adhere in a layered shape onto the molding surface 61, that is, approximately 1 μm to 5 μm. In an arbitrary cross section of the surface layer S1, the area of the copper structure is larger than the area of the iron structure, and specifically, the copper structure occupies an area of 60% or more.

Figure 8:
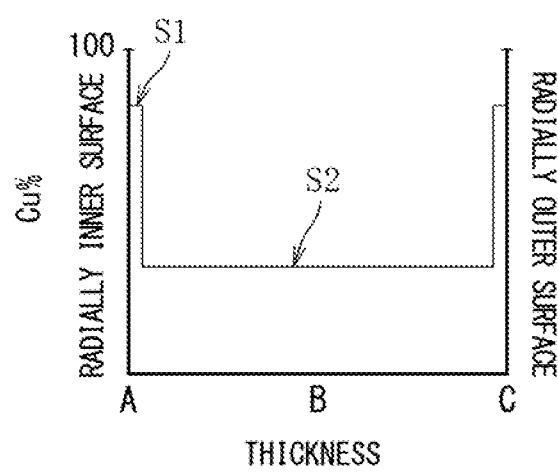
FIG. 8 is a graph showing the content ratio of copper in a radial direction of the bearing.

The base part S2 positioned on the inner side of the surface layer S1 is basically covered with the surface layer S1. As shown in FIG. 8, the copper content in the base part S2 is smaller than the copper content in the surface layer S1, and the copper content is abruptly reduced at a boundary between the surface layer S1 and the base part S2. Further, the copper content (wt %) in each portion of the base part S2 is uniform.

With the above-mentioned configuration, in the entire surface of the surface layer S1 including the bearing surface 1a, the area ratio of the copper structure to the iron structure is 60% or more. Therefore, the initial running-in characteristics and the quietness of the sintered bearing 1 can be improved. Further, the entire iron structure contained in the bearing 1 is formed of the ferrite phase αFe, and hence, even if the surface layer S1 is worn and the iron structure of the base part S2 is therefore exposed to the surface, the bearing surface can be softened so that the aggressiveness to the shaft 2 can be suppressed.

Meanwhile, the copper content in the base part S2 positioned on the inner side of the surface layer S1 is smaller than that in the surface layer S1, and the base part S2 has a hard structure that is rich in iron content. In this manner, the base part 32 that occupies substantially the entire portion of the bearing 1 is rich in iron content, and hence the usage amount of copper can be reduced in the entire bearing 1, with the result that the cost can be reduced more greatly as compared to the copper-based sintered bearing. Further, even if the surface layer S1 is worn due to sliding between the surface layer S1 and the shaft 2 and the base part S2 containing a large amount of the iron structure is therefore exposed, to the bearing surface 1a, the iron structure is formed of the ferrite phase αFe, and hence, even under a state in which the copper content is reduced, the aggressiveness to the shaft 2 can be suppressed and the durability of the bearing can be secured. This durability is sufficiently attained when the content of the copper structure in the base part S2 is at least 10 wt % or more.

As described above, in the present invention, the flat copper powder is used, and the green compact is formed under a state in which the flat copper powder caused to adhere onto the molding surface 61. Thus, the copper content is increased in the surface layer S1, and the iron content is increased in the region other than the surface layer S1, to thereby realize optimum distribution of the copper structure and the iron structure. Further, the iron structure is set to the ferrite phase αFe intendedly, and hence the wear of the shaft 2 is also suppressed when the copper-rich surface layer S1 is worn. Accordingly, it is possible to realize both the improvement in durability and the reduction in cost through the reduction in usage amount of copper.

In addition, free graphite is precipitated in the entire surface including the bearing surface 1a, and further, flake graphite is caused to adhere onto the molding surface 61 together with the flat copper powder 3. Thus, the content ratio of free graphite is also high in the surface layer S1. Therefore, the friction of the bearing surface 1a can be reduced, and the durability of the bearing 1 can be increased. Further, in both the surface layer S1 and the base part S2, the copper structure and the iron structure are bonded to each other with the low-melting point metal, with the result that the bonding strength between the copper structure and the iron structure and the bonding strength between the respective copper structures become higher. Therefore, the strength and durability of the entire bearing 1 become higher than those of the bronze-based sintered bearing of the related art. Further, a PV limit value of PV>200 MPa·m/min can be attained, and even under such a use condition, the friction can be reduced. As a result, the bearing 1 is adaptable to further increase in load capacity and rotation speed to be expected in the future. Thus, according to the present invention, it is possible to obtain a sintered bearing having only the advantages of both the bronze-based bearing and the iron-based sintered bearing (or the iron-copper sintered bearing).

In order to confirm the above-mentioned actions and effects to be attained in the present invention, a comparison test, was conducted between the product of the present invention and the bronze-based sintered bearing and the copper-iron-based sintered bearing of the related art for the initial running-in characteristics, the PV limit value, and the amount of wear.

In the comparison test, the compositions (weight ratio) of the respective bearings were set as follows. Product of the present invention . . . iron: 80.2%, copper: 18.0% (flat copper powder: 8%), tin: 1.0%, graphite: 0.8% Bronze-based bearing . . . copper: 88.8%, tin: 9.9%, graphite: 1.3% Copper-iron based sintered bearing . . . iron: 77.2%, copper: 20.0%, tin: 2.0%, graphite: 0.8%

Figure 9:
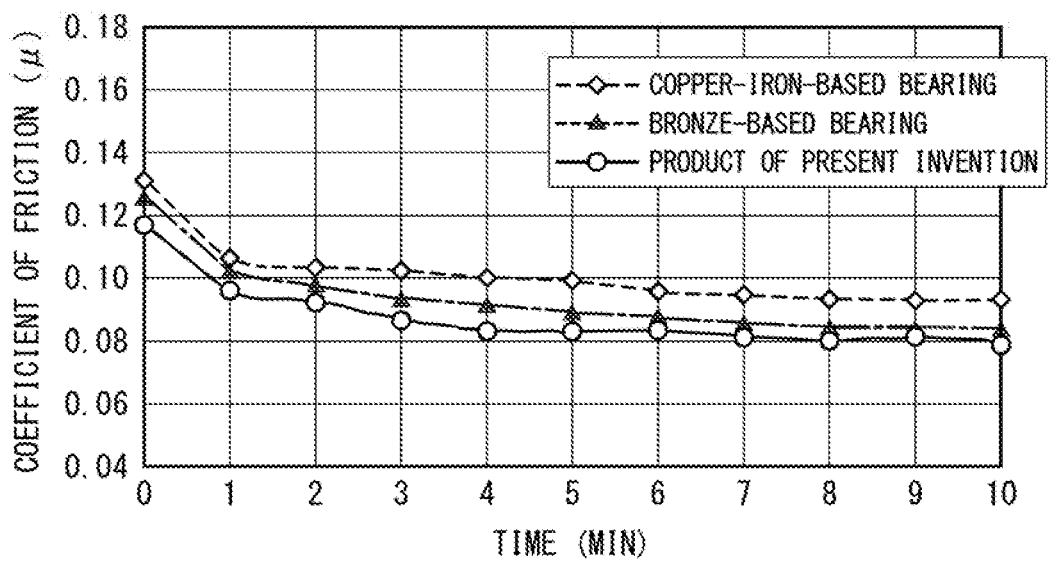
FIG. 9 is a graph showing measurement results of initial running-in characteristics.
Figure 10:
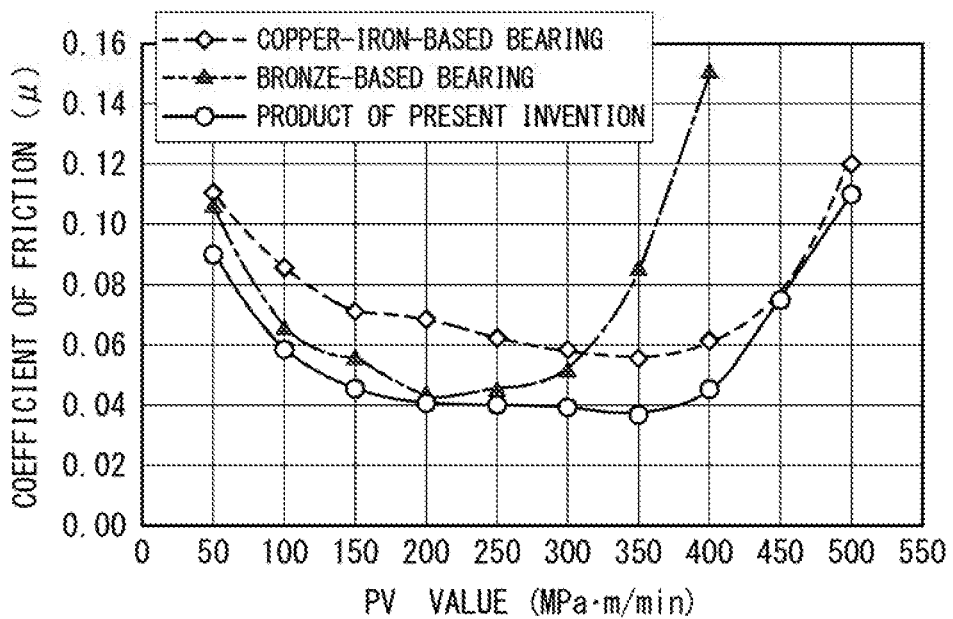
FIG. 10 is a graph showing measurement results of a PV limit value.

Further, each test condition is as follows.
[Measurement Test for Initial Running-In Characteristics]
Peripheral speed: 38 m/min
Load: 1.1 MPa
Specifications of shaft: SUS420J2 (HRC55)
Bearing size: 6×12×6 (The inner diameter dimension, the outer diameter dimension, and the length are indicated in the stated order in mm unit. The same applies hereinafter.)
Running clearance: 0.020 mm
Temperature: normal temperature
[Measurement Test for PV Limit Value]
Specifications of Shaft: SUS420J2 (HRC55)
Bearing size: 6×12×6
Running clearance: 0.020 mm
Temperature: normal temperature
[Measurement Test for Amount of Wear]
Peripheral speed: 38 to 75 m/min
Load: 0.7 to 4.0 MPa
Specifications of shaft: SUS420J2 (HRC55)
Bearing size: 6×12×6
Running clearance: 0.020 mm
Temperature: normal temperature
Time: 8 h FIG. 9 shows results of the measurement test for the initial running-in characteristics. FIG. 10 shows results of the measurement test for the PV limit value. FIG. 11 shows results of the test for the amount of wear.

It was found from FIG. 9 that, even in a case where the blending ratio of copper was set to the above-mentioned lower limit, value, the product of the present invention was less liable to cause friction from the time immediately after the start of running, and had initial running-in characteristics greater than those of the copper-iron-based bearing and equivalent to or greater than those of the bronze-based bearing. Further, it is understood from FIG. 10 that the friction is sufficiently reduced even under a PV value higher than 200 MPa·m/min, and the product of the present invention is available in practical use up to a PV value of approximately 500 MPa·m/min. Further, it is understood from FIG. 11 that the amount of wear is small in the product of the present invention, and the product of the present invention has durability equal to or higher than that of the bronze-based bearing as well as the copper-iron-based bearing.

Other Embodiments

In the above-mentioned first embodiment, the entire iron structure is formed of the soft ferrite phase. In this configuration, however, depending on the use condition of the bearing (for example, in a case where the bearing is used under high surface pressure) or the like, the wear resistance of the bearing surface may become insufficient when the surface layer is worn and the base part is therefore exposed.

In this case, the iron structure is formed of a two-phase structure containing the ferrite phase and the pearlite phase, and thus the hard pearlite phase contributes to improvement in wear resistance to suppress the wear of the bearing surface under high surface pressure. As a result, the life of the bearing can be prolonged (second embodiment). When the presence ratio of the pearlite γFe becomes excessively high as illustrated in FIG. 6 through diffusion of carbon to reach the ratio at the same level as that of the ferrite αFe, the aggressiveness to the shaft due to pearlite is increased significantly, and hence the shaft is easily worn. In order to prevent this phenomenon, as illustrated in FIG. 12, the amount of the pearlite phase (γFe) is suppressed to the extent that the pearlite phase (γFe) is present (in a scattered manner) at a grain boundary of the ferrite phase (αFe). The "grain boundary" herein refers to not only a grain boundary formed between the ferrite phases or between the ferrite phase and another grain, but also a crystal grain boundary 10 in the ferrite phase (αFe). In FIG. 12, the pearlite phase that is present at the former grain boundary is represented by γFe1, and the pearlite phase that is present in the latter grain boundary is represented by γFe2. It is desired that the ratio of the pearlite phase γFe (γFe1–γFe2) to the ferrite phase αFe in an arbitrary cross section of the base part S2 be set to 5 to 20% in terms of the area ratio.

The growth rate of pearlite mainly depends on the sintering temperature. Thus, it order that the pearlite phase be present at the grain boundary of the ferrite phase in the above-mentioned manner, the sintering is carried out under the conditions that the sintering temperature is set higher than that of the first embodiment, that is, set to approximately 820° C. to 900° C. (see FIG. 14), and gas containing carbon, such as natural gas and endothermic gas (RX gas), is used as the furnace atmosphere. Accordingly, carbon contained in the gas diffuses into iron at the time of sintering, with the result that the pearlite phase γFe can be formed. Note that, when the sintering is carried out at a temperature higher than 900° C., carbon in the graphite powder reacts with iron. Other configurations such as the composition of the raw material powders and the manufacturing procedure are common to the first embodiment, and redundant description thereof is therefore omitted herein.

Note that, in the above description, there is exemplified a case where the present invention is applied to a cylindrical bearing having the bearing surface 1a formed into a perfect circle shape. However, the present invention is not limited to the cylindrical bearing, and is similarly applicable to a fluid dynamic bearing having dynamic pressure generating grooves such as herringbone grooves and spiral grooves formed in the bearing surface 1a or the outer peripheral surface of the shaft 2.

REFERENCE SIGNS LIST 1 bearing
1a bearing surface
2 shaft
3 flat copper powder
4 flake graphite
6 mold
9 green compact
10 crystal grain boundary
61 molding surface
L length of flat powder
t thickness of flat powder

The invention claimed is:

1. A sintered bearing containing an iron structure, a copper structure and a free graphite,
   the copper structure and the iron structure are bonded to each other with a low-melting point metal,
   the copper structure are formed of flat copper powder having an aspect ratio of 13.3 or more and normal copper powder,
   the sintered bearing comprises, a base part comprising copper at a uniform content, and a surface layer covering a surface of the base part, the surface layer comprising copper at a larger content than the base part,
   the copper structure and the iron structure are formed in a bearing surface of the surface layer, the copper structure being formed in the bearing surface at an area ratio of 60% or more,
   the iron structure of the bearing surface is formed of the ferrite phase,
   the content of the copper in the sintered bearing is 18 wt % or more and 40 wt % or less.

2. A sintered bearing containing an iron structure, a copper structure and a free graphite,
   the copper structure and the iron structure are bonded to each other with a low-melting point metal,
   the copper structure is formed of flat copper powder having an aspect ratio of 13.3 or more and normal copper powder,
   the sintered bearing comprises a base part comprising copper at a uniform content, and a surface layer covering a surface of the base part, the surface layer comprising copper at a larger content than the base part,
   the copper structure and the iron structure are formed in a bearing surface of the surface layer, the copper structure being formed in the bearing surface at an area ratio of 60% or more,
   the iron structure of the bearing surface is formed of the ferrite phase and a pearlite phase that is present at a grain boundary of the ferrite phase,
   the content of the copper in the sintered bearing is 18 wt % or more and 40 wt % or less.

3. The sintered bearing according to claim 1, wherein a ratio of the low-melting point metal to the copper is set to less than 10% in terms of a weight ratio.

4. The sintered bearing according to claim 1, wherein a content of the free graphite is set larger in the surface layer than in the base part.

5. The sintered bearing according to claim 2, wherein a ratio of the low-melting point metal to the copper is set to less than 10% in terms of a weight ratio.

6. The sintered bearing according to claim 2, wherein a content of the free graphite is set larger in the surface layer than in the base part.

* * * * *